US011934115B2

(12) United States Patent
Fukunaga et al.

(10) Patent No.: US 11,934,115 B2
(45) Date of Patent: Mar. 19, 2024

(54) TRANSPORT DEVICE

(71) Applicant: FUJIFILM Business Innovation Corp., Tokyo (JP)

(72) Inventors: Kazuya Fukunaga, Kanagawa (JP); Junji Hanatani, Kanagawa (JP); Kiichiro Iijima, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/947,866

(22) Filed: Sep. 19, 2022

(65) Prior Publication Data

US 2023/0305447 A1 Sep. 28, 2023

(30) Foreign Application Priority Data

Mar. 25, 2022 (JP) ................................ 2022-050045

(51) Int. Cl.
*G03G 15/16* (2006.01)
*G03G 15/20* (2006.01)

(52) U.S. Cl.
CPC ..... *G03G 15/1615* (2013.01); *G03G 15/2053* (2013.01); *G03G 15/2064* (2013.01); *G03G 2215/2038* (2013.01)

(58) Field of Classification Search
CPC .. G03G 15/16; G03G 15/161; G03G 15/1605; G03G 15/1615
See application file for complete search history.

(56) References Cited

U.S. PATENT DOCUMENTS

2014/0209437 A1* 7/2014 Hozumi ................. B41J 11/007 198/806

FOREIGN PATENT DOCUMENTS

JP 2007108788 A * 4/2007
JP 2009-025475 A 2/2009
JP 2015-156044 A 8/2015

* cited by examiner

*Primary Examiner* — Thomas S Giampaolo, II
(74) *Attorney, Agent, or Firm* — Oliff PLC

(57) ABSTRACT

A transport device includes: a belt member that runs in a loop to transport an object to be transported, the belt member having an outer circumferential surface and an inner circumferential surface; a rotary member that is pressed against one of the outer and inner circumferential surfaces of the belt member and that is movable in a predetermined moving direction; and a pressing member that presses the rotary member toward the one of the outer and inner circumferential surfaces of the belt member and that moves in the moving direction while maintaining the angle thereof with respect to the moving direction when the rotary member moves in the moving direction.

11 Claims, 12 Drawing Sheets

TRANSPORT DEVICE

CROSS-REFERENCE TO RELATED APPLICATIONS

This application is based on and claims priority under 35 USC 119 from Japanese Patent Application No. 2022-050045 filed Mar. 25, 2022.

BACKGROUND

(i) Technical Field

The present disclosure relates to a transport device.

(ii) Related Art

Japanese Unexamined Patent Application Publication No. 2009-25475 discloses a configuration in which a cam follower face moves a bearing inward when the front-surface side of a steering roller moves upward, and the cam follower face moves the bearing outward when the front-surface side of the steering roller moves downward.

Japanese Unexamined Patent Application Publication No. 2015-156044 discloses a configuration in which, when a belt moves to one end, a first adjustment member receives a force from the belt and moves, and a second adjustment member is moved by an interlocking member, thus tilting one stretching member with respect to the other stretching member.

SUMMARY

In some devices for transporting an object with a belt member, a rotary member is pressed against the belt member by a pressing member.

In this configuration, when the pressing direction in which the pressing member presses the rotary member changes, the rotary member moves in another direction. This may cause a fault in the device or may require a separate mechanism for suppressing the fault.

Aspects of non-limiting embodiments of the present disclosure relate to reducing the change of the pressing direction of a pressing member for pressing a rotary member, compared with a configuration in which only the side of the pressing member connected to the rotary member moves, or a configuration in which the rotary member pressed by the pressing member moves along a liner path.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a transport device including: a belt member that runs in a loop to transport an object to be transported, the belt member having an outer circumferential surface and an inner circumferential surface; a rotary member that is pressed against one of the outer and inner circumferential surfaces of the belt member and that is movable in a predetermined moving direction; and a pressing member that presses the rotary member toward the one of the outer and inner circumferential surfaces of the belt member and that moves in the moving direction while maintaining the angle thereof with respect to the moving direction when the rotary member moves in the moving direction.

BRIEF DESCRIPTION OF THE DRAWINGS

Exemplary embodiments of the present disclosure will be described in detail based on the following figures, wherein:

FIG. 3 is an enlarged view of the tension roller and the like;

FIGS. 4A and 4B show the configuration of a related-art tension roller and the like;

FIGS. 6A and 6B show the movement of one end of the tension roller and the like;

FIGS. 8A and 8B show the movement of the tension roller and the like;

FIGS. 10A and 10B show the movement of the tension roller and the like;

FIG. 12 shows another configuration example of the tension roller and the like.

DETAILED DESCRIPTION

Exemplary embodiments of the present disclosure will be described below with reference to the attached drawings.

Figure 1:
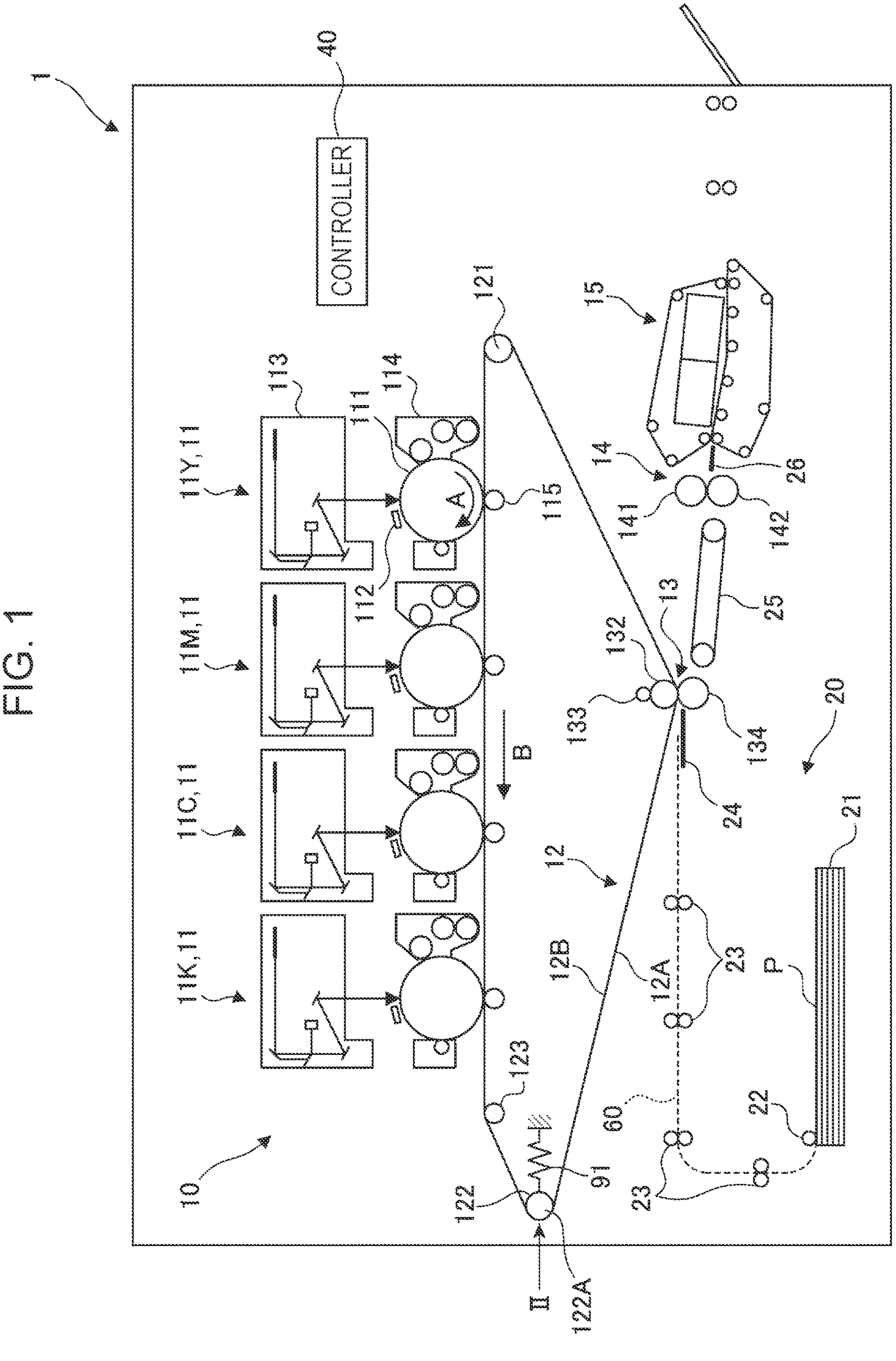
FIG. 1 shows an image forming apparatus.

FIG. 1 shows an image forming apparatus 1 according to an exemplary embodiment of the present disclosure.

The image forming apparatus 1 shown in FIG. 1 forms an image on a sheet P, which is an example of a recording material. The image forming apparatus 1 includes an image forming section 10, a sheet transport section 20, and a controller 40.

The image forming section 10 includes image forming units 11, an intermediate transfer belt 12, a second transfer unit 13, a fixing device 14, and a cooling device 15.

In this exemplary embodiment, the image forming units 11 include four image forming units 11Y, 11M, 11C, and 11K corresponding to toners of four colors, namely, Y (yellow), M (magenta), C (cyan), and K (black).

The image forming units 11Y, 11M, 11C, and 11K are arranged side-by-side in the moving direction of the intermediate transfer belt 12 and electrophotographically form toner images.

The image forming units 11Y, 11M, 11C, and 11K each include a photoconductor drum 111, a charger 112, an exposure unit 113, a developing unit 114, and a first transfer part 115.

The image forming units 11Y, 11M, 11C, and 11K form Y, M, C, and K toner images and transfer the toner images to the intermediate transfer belt 12. Thus, a toner image, in which Y, M, C, and K toner images are superposed on one another, is formed on the intermediate transfer belt 12.

The photoconductor drums 111 rotate in the arrow A direction at a predetermined speed. Electrostatic latent images are formed on the circumferential surfaces of the photoconductor drums 111.

The chargers 112 charge the circumferential surfaces of the photoconductor drums 111 to a predetermined electric potential.

The exposure units 113 radiate light onto the charged circumferential surfaces of the photoconductor drums 111 to form electrostatic latent images on the circumferential surfaces of the photoconductor drums 111.

The developing units 114 allow the toners to adhere to the electrostatic latent images formed on the circumferential surfaces of the photoconductor drums 111 to form toner images.

The first transfer parts 115 transfer the toner images formed on the circumferential surfaces of the photoconductor drums 111 to the intermediate transfer belt 12.

A voltage having the opposite polarity to the charging polarity of the toner is applied to the first transfer parts 115. As a result, the toner images formed on the circumferential surfaces of the photoconductor drums 111 are sequentially and electrostatically attracted to the intermediate transfer belt 12 in a superposed manner, and thus, a single color toner image is formed on the intermediate transfer belt 12.

The intermediate transfer belt 12, serving as an example of a belt member, is supported by multiple roller members. The intermediate transfer belt 12 is an endless belt that runs in a loop in the arrow B direction in FIG. 1. The intermediate transfer belt 12 includes an outer circumferential surface 12A and an inner circumferential surface 12B.

The intermediate transfer belt 12 transports a toner image, which is an example of an object to be transported. The toner image is formed on the outer circumferential surface 12A of the intermediate transfer belt 12 and is transported to the second transfer unit 13 as the intermediate transfer belt 12 moves.

The roller members arranged inside the intermediate transfer belt 12 include a driving roller 121 that is driven by a motor (not shown) and drives the intermediate transfer belt 12.

The roller members also include an idle roller 123 and a backup roller 132 that support the intermediate transfer belt 12.

These roller members are rotatable and are pressed against the inner circumferential surface 12B of the intermediate transfer belt 12.

The roller members also include a tension roller 122 that applies tension to the intermediate transfer belt 12 and that controls the position of the intermediate transfer belt 12 in the width direction, i.e., the direction perpendicular to the moving direction of the intermediate transfer belt 12.

The tension roller 122 is also rotatable and is pressed against the inner circumferential surface 12B of the intermediate transfer belt 12.

A first spring 91 and a second spring 92, serving as an example of a pressing member, that press the tension roller 122 toward the inner circumferential surface 12B of the intermediate transfer belt 12 are provided.

FIG. 1 shows only the first spring 91. The second spring 92 is disposed behind the first spring 91 in the direction perpendicular to the plane of the drawing of FIG. 1. In other words, the second spring 92 is disposed on the rear side of the image forming apparatus 1.

The first spring 91 presses a first end 122A, in the axial direction, of the tension roller 122 toward the inner circumferential surface 12B of the intermediate transfer belt 12. The second spring 92 presses a second end 122B (not shown in FIG. 1), in the axial direction, of the tension roller 122 toward the inner circumferential surface 12B of the intermediate transfer belt 12.

The first and second springs 91 and 92 are coil springs. The first and second springs 91 and 92 may be another type of springs. The first and second springs 91 and 92 do not have to be compression springs, but may be extension springs.

The part including the intermediate transfer belt 12, the driving roller 121, the tension roller 122, the idle roller 123, the backup roller 132, and the first and second springs 91 and 92 may be regarded as a transport device that transports a toner image, which is an example of an object to be transported.

The sheet transport section 20 includes a sheet storage part 21 that stores a stack of sheets P, and a pickup roller 22 that picks up and feeds a sheet P stored in the sheet storage part 21.

The sheet transport section 20 also includes transport rollers 23 that transport the sheet P picked up by the pickup roller 22 along a sheet transport path 60, and a sheet guide 24 that guides the sheet P transported by the transport rollers 23 to the second transfer unit 13.

The sheet transport section 20 also includes a transport belt 25 that transports the sheet P to the fixing device 14 after the second transfer, and a sheet guide 26 that guides the sheet P to the cooling device 15 after fixing.

The second transfer unit 13 includes a second transfer roller 134 disposed in contact with the outer circumferential surface 12A of the intermediate transfer belt 12, and a backup roller 132 disposed on the inner circumferential surface 12B of the intermediate transfer belt 12 to serve as a counter electrode for the second transfer roller 134.

A power supply roller 133, which is made of metal, applies a second transfer bias to the backup roller 132.

The thus-configured second transfer unit 13 transfers a toner image transported to the second transfer unit 13 by the intermediate transfer belt 12 to a sheet P transported thereto.

The fixing device 14 is disposed downstream of the second transfer unit 13 in the sheet transport direction. The fixing device 14 includes a fixing roller 141 having a heat source, and a pressure roller 142 that is opposed to and presses the fixing roller 141.

When the sheet P that has passed through the second transfer unit 13 is transported to the position between the fixing roller 141 and the pressure roller 142, the unfixed toner image on the sheet P is melted and fixed to the sheet P. Thus, an image is formed on the sheet P.

The cooling device 15 for cooling the sheet P transported from the fixing device 14 is provided downstream of the fixing device 14 in the sheet transport direction.

Figures 2A, 2B, 2C:
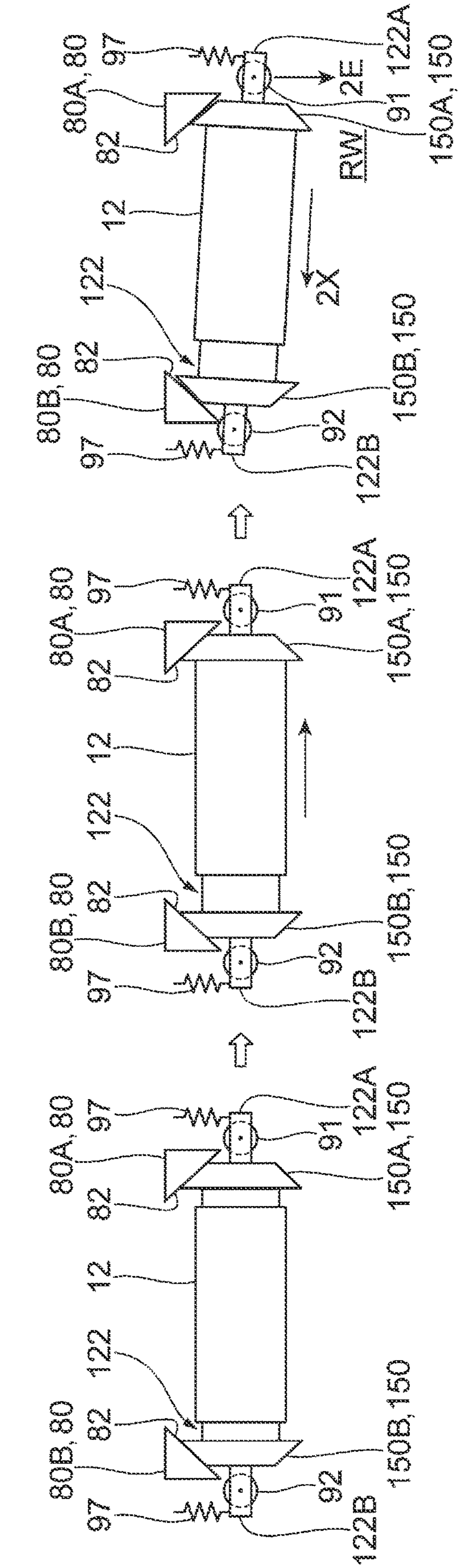
FIGS. 2A to 2C show a tension roller and the like, as viewed from the arrow II direction in FIG. 1.

FIGS. 2A to 2C show the tension roller 122 and the like, as viewed from the arrow II direction in FIG. 1.

As shown in FIG. 2A and as described above, there are the first and second springs 91 and 92.

The first spring 91, serving as an example of a first-end pressing member, presses the first end 122A of the tension roller 122 toward the inner circumferential surface 12B of the intermediate transfer belt 12.

The second spring 92, serving as an example of a second-end pressing member, presses the second end 122B of the tension roller 122 toward the inner circumferential surface 12B of the intermediate transfer belt 12.

The first and second springs 91 and 92 are disposed behind the tension roller 122 in the direction perpendicular to the plane of the drawing of FIGS. 2A to 2C and press the tension roller 122 toward the near side in FIGS. 2A to 2C.

Furthermore, as shown in FIG. 2A, guides 80 for tilting the tension roller 122, which is an example of a rotary member, are provided. More specifically, the guides 80 include a first guide 80A and a second guide 80B.

The first guide 80A is located on the first end 122A side of the tension roller 122, and the second guide 80B is located on the second end 122B side of the tension roller 122.

The first and second guides 80A and 80B have inclined surfaces 82, which are inclined with respect to both the axial and radial directions of the tension roller 122.

The tension roller 122 has guided parts 150 to be guided by the guides 80.

More specifically, the guided parts 150 include a first guided part 150A guided by the first guide 80A, and a second guided part 150B guided by the second guide 80B.

Furthermore, urging springs 97 for urging the tension roller 122 toward the first and second guides 80A and 80B are provided.

With the urging springs 97, the first guided part 150A is pressed against the first guide 80A, and the second guided part 150B is pressed against the second guide 80B.

As shown in, for example FIG. 2B, when the intermediate transfer belt 12 moves in the width direction thereof, the intermediate transfer belt 12 comes into contact with the first guided part 150A. As a result, the first guided part 150A is pressed against the inclined surface 82 of the first guide 80A.

When the first guided part 150A is pressed against the inclined surface 82 of the first guide 80A, as shown in FIG. 2C, the first guided part 150A moves toward a side RW, which is the opposite side of the tension roller 122 from the first guide 80A. As a result, the tension roller 122 is tilted, as shown in FIG. 2C.

When the guided part 150 is pressed against either the first guide 80A or the second guide 80B (guide 80), the inclined surface 82 of the first guide 80A or the second guide 80B moves the guided part 150 toward the side RW, which is the opposite side of the tension roller 122 from the guide 80.

As a result, the tension roller 122 is tilted, as shown in FIG. 2C.

When the tension roller 122 is tilted, the intermediate transfer belt 12 moves in the arrow 2X direction in FIG. 2C.

More specifically, when the tension roller 122 is tilted, the intermediate transfer belt 12 moves toward the second end 122B, which is the end that has moved toward the side RW by a smaller distance than the other, of the first and second ends 122A and 122B of the tension roller 122.

With this movement, even when the intermediate transfer belt 12 moves to one side in the width direction thereof, the intermediate transfer belt 12 moves toward the other side automatically.

In other words, because of the lateral movement of the intermediate transfer belt 12, even when the intermediate transfer belt 12 moves to one side in the width direction thereof, the intermediate transfer belt 12 moves toward the other side automatically.

When the intermediate transfer belt 12 has moved to one side in the width direction thereof, and the first guided part 150A is pressed against the first guide 80A, the first end 122A of the tension roller 122 moves toward the side RW.

More specifically, as shown in FIG. 2C, the first end 122A of the tension roller 122 moves downward, i.e., in the arrow 2E direction.

In other words, the first end 122A of the tension roller 122 moves in a direction intersecting the width direction of the intermediate transfer belt 12, in which the intermediate transfer belt 12 moves.

The first and second ends 122A and 122B of the tension roller 122 can move downward, which is a predetermined moving direction, and can also move upward, which is reverse to the downward direction.

With this movement, the tension roller 122 is tilted, causing the intermediate transfer belt 12 to move in the width direction thereof.

Figure 3:
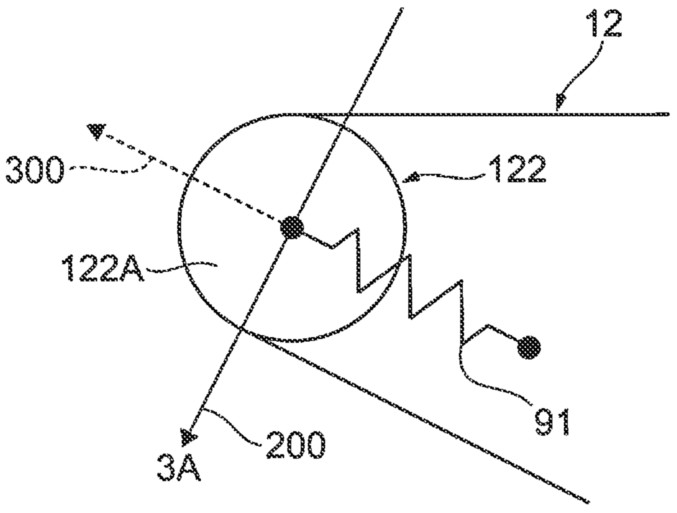

FIG. 3 is an enlarged view of the tension roller 122 and the like.

As described above, the first spring 91 urges the first end 122A of the tension roller 122 toward the intermediate transfer belt 12.

Although not illustrated in FIG. 3, the second spring 92 urges the second end 122B of the tension roller 122 toward the intermediate transfer belt 12.

As described above, the tension roller 122 is movable in a predetermined moving direction 200, i.e., the arrow 3A direction in FIG. 3.

Although the movement of the first end 122A of the tension roller 122 will be described below, the second end 122B of the tension roller 122 moves in the same way as the first end 122A.

In the state shown in FIG. 3, a pressing direction 300, in which the first spring 91 presses the tension roller 122, and the moving direction 200 of the tension roller 122 are perpendicular to each other.

In other words, the pressing direction 300, in which the first spring 91 presses the tension roller 122, and the direction in which the tension roller 122 moves due to the movement of the intermediate transfer belt 12 in the width direction are perpendicular to each other.

Herein, "the moving direction 200 of the tension roller 122" is a direction which intersects the width direction of the intermediate transfer belt 12 and in which the tension roller 122 moves due to the movement of the intermediate transfer belt 12 in the width direction.

As shown in FIG. 3, when the pressing direction 300, in which the first spring 91 presses the tension roller 122, and the moving direction 200 of the tension roller 122 are perpendicular to each other, movement of the tension roller 122 in the moving direction 200 of the tension roller 122, due to being pressed by the first spring 91, does not occur.

More specifically, movement of the tension roller 122 to the diagonally lower left or to the diagonally upper right in FIG. 3, due to being pressed by the first spring 91, does not occur.

Figure 4B:
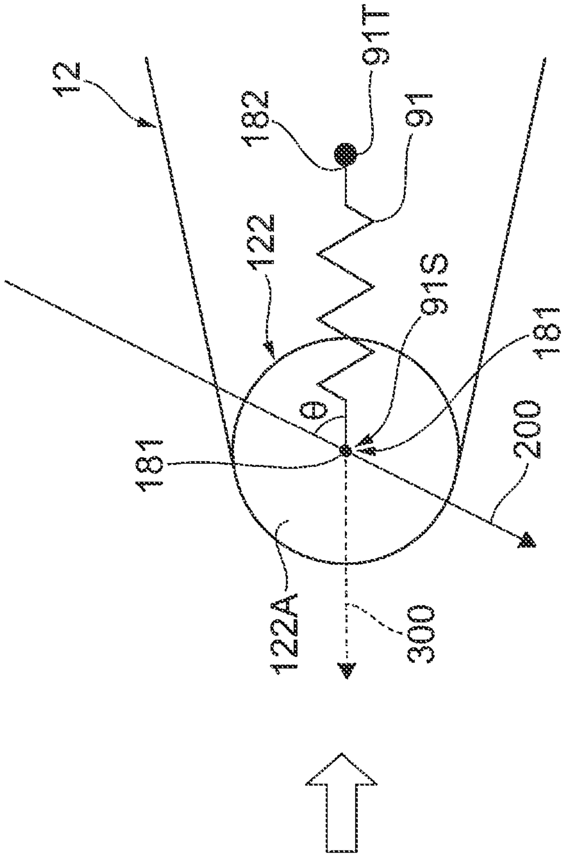
FIG. 4B RELATED ART
Figure 4A:
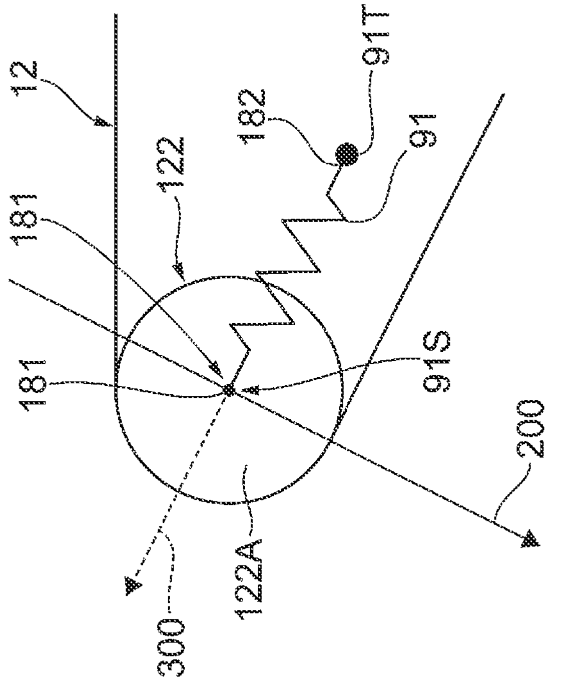
FIG. 4A RELATED ART

FIGS. 4A and 4B show the configuration of a related-art tension roller 122 and the like.

In the configuration in which the tension roller 122 is pressed by the first and second springs 91 and 92, further movement of the tension roller 122 due to being pressed by the first and second springs 91 and 92 may occur, along with the movement of the tension roller 122 in the moving direction 200.

As shown in FIG. 4B, when the first end 122A of the tension roller 122 moves downstream in the moving direction 200, a point of application 91S, on which a force exerted by the first spring 91 acts, moves from the position shown in FIG. 4A to the diagonally lower left in FIG. 4B.

In this case, while a fulcrum 91T supporting the first spring 91 does not move, the point of application 91S, on which the force exerted by the first spring 91 on the tension roller 122 acts, moves to the diagonally lower left in FIG. 4B.

In this case, as shown in FIG. 4B, the angle formed between the moving direction 200 of the tension roller 122 and the pressing direction 300 of the first spring 91 is not 90°, so, the tension roller 122 is likely to move downstream in the moving direction 200 due to being pressed by the first spring 91.

When the tension roller 122 moves downstream like this, the guided parts 150 may be separated from the guides 80 (see FIGS. 2A to 2C), making the behavior of the intermediate transfer belt 12 unstable.

More specifically, the first guided part 150A may be separated from the first guide 80A, or the second guided part 150B may be separated from the second guide 80B, making the behavior of the intermediate transfer belt 12 unstable.

Although separation of the guided parts 150 from the guides 80 can be prevented by increasing the urging force of the urging springs 97 (see FIG. 2A), this requires a greater force for tilting the tension roller 122. In other words, a greater force is needed to move the intermediate transfer belt 12 that has moved to one side in the width direction toward the other side.

In this case, the load applied to the intermediate transfer belt 12 when the tension roller 122 is tilted increases, making the intermediate transfer belt 12 more likely to be damaged.

In the configuration in which the relationship between the moving direction 200 of the tension roller 122 and the pressing direction 300 of the first spring 91 changes like this, the behavior of the intermediate transfer belt 12 may become unstable, or the intermediate transfer belt 12 may be damaged.

In contrast, in the configuration according to this exemplary embodiment described below, the tension roller 122 pressed by the first and second springs 91 and 92 is unlikely to move, thus reducing the risk of the problem.

Figure 5A:
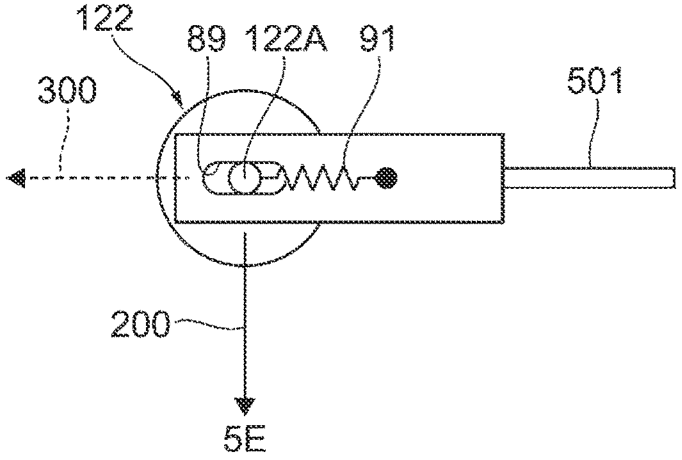
FIGS. 5A and 5B show a configuration example of a mechanism for pressing the tension roller according to this exemplary embodiment.
Figure 5B:
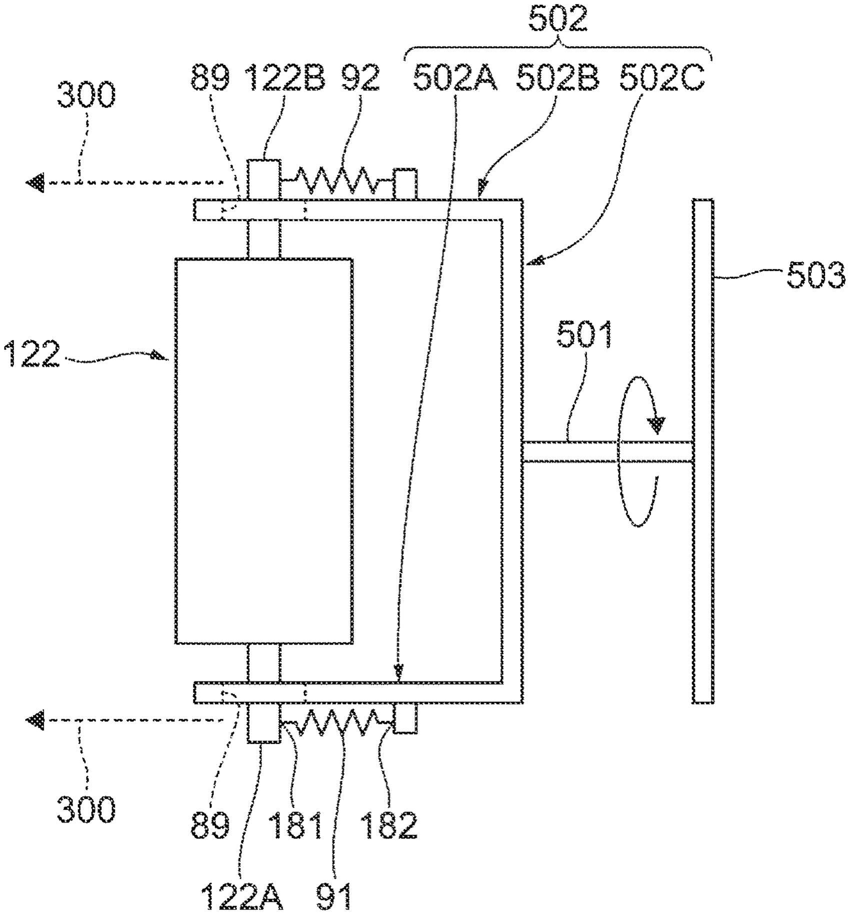

FIGS. 5A and 5B show a configuration example of a mechanism for pressing the tension roller according to this exemplary embodiment.

FIG. 5A shows the tension roller 122 and the like, as viewed from the front side of the image forming apparatus 1, and FIG. 5B shows the tension roller 122 and the like, as viewed from the top of the image forming apparatus 1. FIGS. 5A and 5B do not show the intermediate transfer belt 12.

As shown in FIG. 5B, a shaft 501 extends in the direction perpendicular to the axial direction of the tension roller 122, and a support member 502 is supported by the shaft 501 and supports the tension roller 122.

The shaft 501 is supported by a support frame 503 provided on the body of the image forming apparatus 1.

The support member 502 includes a first support part 502A extending in a direction perpendicular to (intersecting) the axial direction of the tension roller 122 and supporting the first end 122A of the tension roller 122.

The first spring 91 is attached to and supported by the first support part 502A.

The first support part 502A has an elongated hole 89 extending in the longitudinal direction thereof. In other words, the elongated hole 89 extends in the pressing direction 300, in which the first spring 91 presses the tension roller 122.

The first end 122A of the tension roller 122 is placed in the elongated hole 89.

As shown in FIG. 5B, the support member 502 also includes a second support part 502B extending in the direction perpendicular to (intersecting) the axial direction of the tension roller 122 and supporting the second end 122B of the tension roller 122.

The second spring 92 is attached to and supported by the second support part 502B.

The second support part 502B also has an elongated hole 89 extending in the longitudinal direction thereof. In other words, the elongated hole 89 extends in the pressing direction 300, in which the second spring 92 presses the tension roller 122.

The second end 122B of the tension roller 122 is placed in the elongated hole 89.

The support member 502 also includes a rotary part 502C extending in the axial direction of the tension roller 122 and rotatable about the shaft 501.

The rotary part 502C is connected to the shaft 501 and rotates about the shaft 501.

The first and second support parts 502A and 502B are connected to and supported by the rotary part 502C.

The support member 502 is rotatable about the shaft 501, and, when the first end 122A of the tension roller 122 moves downstream in the moving direction 200, the support member 502 rotates about the shaft 501.

In this case, the first end 122A of the tension roller 122 moves in the moving direction 200 indicated by arrow 5E, i.e., downward, in FIG. 5A.

At this time, the second end 122B of the tension roller 122 (see FIG. 5B) moves upward in FIG. 5A.

Figure 6B:
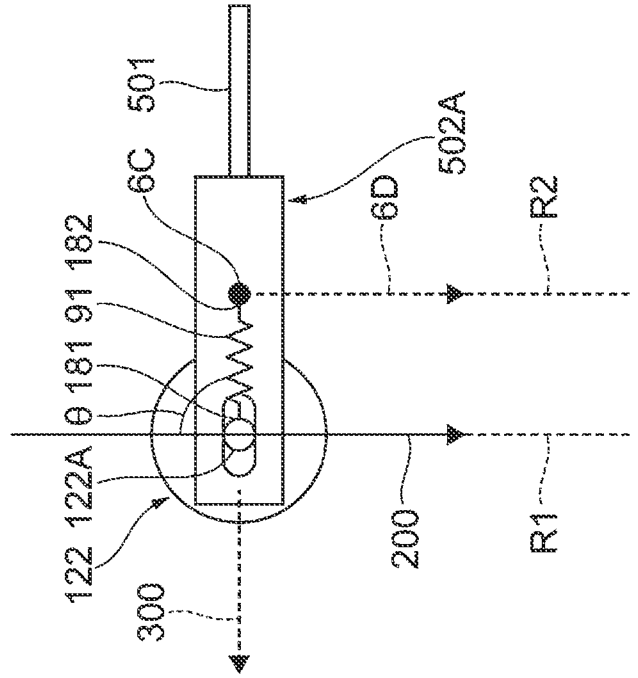
Figure 6A:
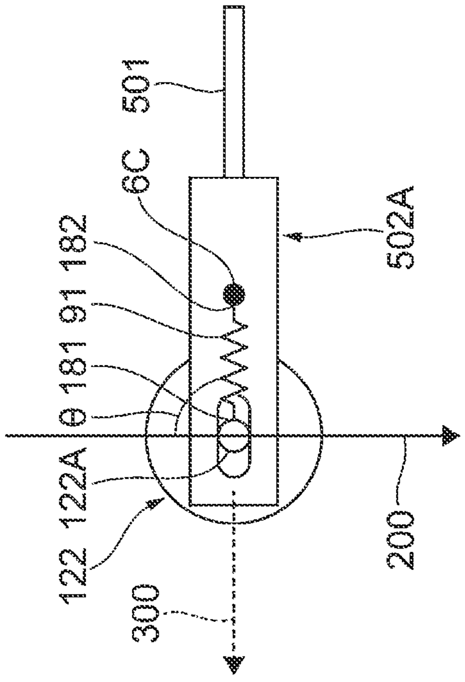

FIGS. 6A and 6B show the movement of the first end 122A of the tension roller 122 and the like.

As shown in FIG. 6B, when the first end 122A of the tension roller 122 moves downstream in the moving direction 200 from the position thereof shown in FIG. 6A, the first spring 91 moves in the moving direction 200 while maintaining the angle θ with respect to the moving direction 200.

In other words, the first spring 91 moves while maintaining the inclination, i.e., the orientation, thereof with respect to the moving direction 200 of the tension roller 122.

In this case, even when the first end 122A of the tension roller 122 has moved in the moving direction 200, the first end 122A is not pressed downstream in the moving direction 200. Hence, the above-described problem is suppressed.

In this exemplary embodiment, the pressing direction 300, in which the first end 122A of the tension roller 122 is pressed, does not change before and after the movement of the first end 122A of the tension roller 122.

In this case, displacement of the first end 122A of the tension roller 122 due to being pressed by the first spring 91 is suppressed. Hence, the above-described problem is suppressed.

As shown in FIG. 6A, the first and second springs 91 and 92 (the second spring 92 is not shown in FIGS. 6A and 6B) each have a connected end 181, which is located on the tension roller 122 side and is connected to the tension roller 122, and an opposite end 182 located on the opposite side from the connected end 181.

The opposite end 182 of the first spring 91 is connected to a portion 6C of the first support part 502A and is supported by the first support part 502A.

The second spring 92 and the second support part 502B are configured in the same way as the first spring 91 and the first support part 502A.

The first and second springs 91 and 92 are connected to the tension roller 122 either directly or indirectly; that is, the first and second springs 91 and 92 may be connected to the tension roller 122 through other members.

In that case, the ends of the first and second springs 91 and 92 connected to the other members serve as the connected ends 181.

As shown in FIG. 6B, when the first end 122A of the tension roller 122 moves downstream in the moving direction 200, the opposite end 182 of the first spring 91 also moves downstream in the moving direction 200, as indicated by arrow 6D.

When the first end 122A of the tension roller 122 moves downstream in the moving direction 200, the first support part 502A is translated, and thus, the opposite end 182 of the first spring 91 also moves downstream in the moving direction 200.

Not only the connected end 181, but also the opposite end 182 move downstream.

Because the opposite end 182 also moves downstream in the moving direction 200, the angle θ of the first spring 91 with respect to the moving direction 200 is maintained.

In the configuration in which the opposite end 182 (see FIG. 6B) also moves in the moving direction 200, the change in the angle θ of the first spring 91 with respect to the moving direction 200 is small, compared with the configuration in which only the connected end 181 moves, as shown in FIGS. 4A and 4B.

In this exemplary embodiment, the difference in the angle θ between before and after the movement of the first end 122A of the tension roller 122 is small.

When the change in the angle θ of the first spring 91 with respect to the moving direction 200 is small like this, the substantially perpendicular angle between the pressing direction 300, in which the first spring 91 presses the tension roller 122, and the moving direction 200 of the tension roller 122 is likely to be maintained. Hence, the above-described problem is unlikely to occur.

As shown in FIG. 6B, the opposite end 182 of the first spring 91 moves along a path R2 parallel to a path R1, along which the first end 122A of the tension roller 122 moves when moving in the moving direction 200.

The amount of movement of the first end 122A of the tension roller 122 in the moving direction 200 and the amount of movement of the opposite end 182 of the first spring 91 toward the downstream side in the moving direction 200 are equal.

Hence, the angles θ of the first spring 91 with respect to the moving direction 200 before and after the movement of the first end 122A of the tension roller 122 are equal.

Note that the amount of movement of the first end 122A of the tension roller 122 in the moving direction 200 and the amount of movement of the opposite end 182 of the first spring 91 toward the downstream side in the moving direction 200 may be different.

The amount of movement of the opposite end 182 may be larger or smaller than the amount of movement of the first end 122A of the tension roller 122.

Even in that case, the problem will be less severe than the case where the opposite end 182 does not move at all, as shown in FIGS. 4A and 4B.

In this exemplary embodiment, the first spring 91 (see FIG. 5B) is movable about a shaft extending in the direction from the opposite end 182 toward the connected end 181.

More specifically, the shaft 501 extends in the direction from the opposite end 182 toward the connected end 181, and the first spring 91 moves about the shaft 501.

As a result of the first spring 91 moving about the shaft 501, both the connected end 181 and the opposite end 182 of the first spring 91 move.

At this time, the first spring 91 may move about an extension line of the shaft 501.

The shaft 501 extends in the pressing direction 300 of the first spring 91, and the first spring 91 moves about the shaft 501 extending in the pressing direction 300.

As shown in FIG. 5B, the shaft 501 extending in the pressing direction 300 of the first spring 91 is located closer to the second end 122B of the tension roller 122 than the first end 122A of the tension roller 122 is.

The first spring 91 moves about the shaft 501, which is located closer to the second end 122B than the first end 122A of the tension roller 122 is.

Furthermore, both the first and second springs 91 and 92 move about the single shaft 501.

The first and second springs 91 and 92 are not located on the extension line of the shaft 501, but are located eccentrically with respect to the shaft 501, which serves as the center of rotation of the support member 502.

Figure 7A:
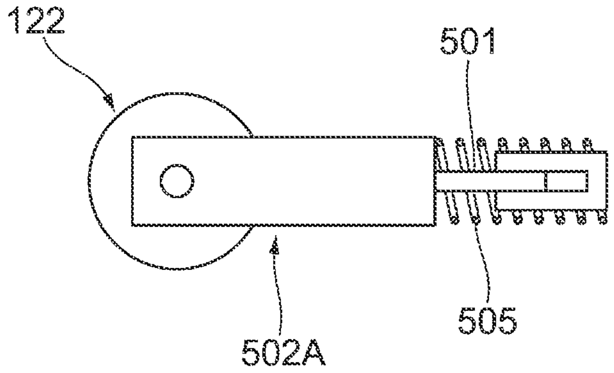
FIGS. 7A and 7B show another configuration example of a mechanism for pressing the tension roller.
Figure 7B:
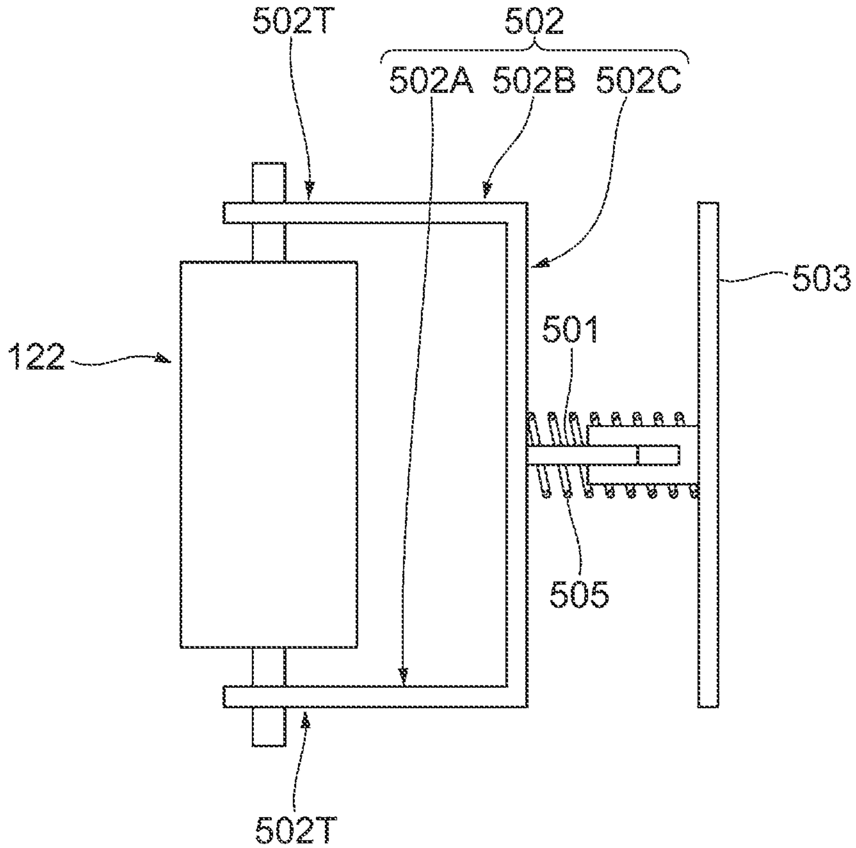

FIGS. 7A and 7B show another configuration example of a mechanism for pressing the tension roller 122.

Also in this configuration example, the shaft 501 extends in the direction perpendicular to the axial direction of the tension roller 122, and the support member 502 is supported by the shaft 501 and supports the tension roller 122.

In this configuration example, a spring 505 that urges the support member 502 toward the inner circumferential surface 12B of the intermediate transfer belt 12 (not shown in FIGS. 7A and 7B) is fitted on the shaft 501.

The first and second support parts 502A and 502B of the support member 502 serve as pressing members for pressing the tension roller 122.

More specifically, two ends 502T of the support member 502 located on the tension roller 122 side serve as the pressing members.

The first and second support parts 502A and 502B receive the urging force from the spring 505, which is an example of an urging member, and press the tension roller 122 toward the intermediate transfer belt 12.

Figure 8B:
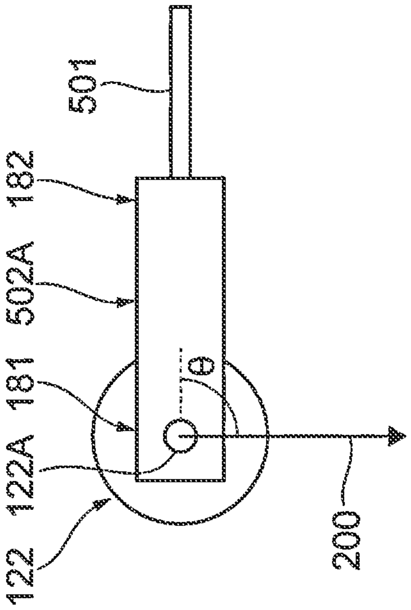
Figure 8B:
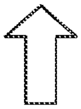
Figure 8A:
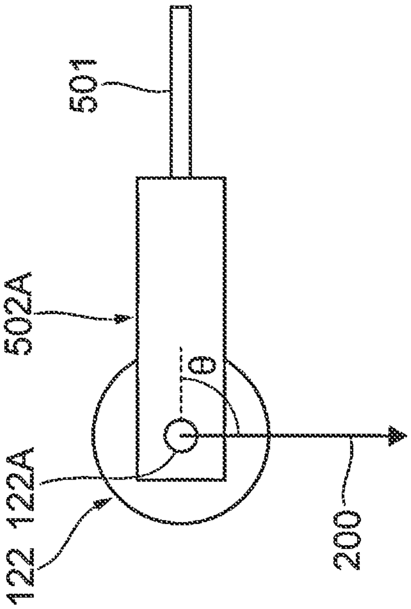

Also in this configuration, as shown in FIGS. 8A and 8B, which show the movement of the tension roller 122 and the like, when the first end 122A of the tension roller 122 moves downstream in the moving direction 200, the support member 502 (see FIG. 7B) rotates about the shaft 501.

Hence, also in this case, the entirety of the first support part 502A (see FIGS. 8A and 8B) is translated, and the first support part 502A moves in the moving direction 200 of the tension roller 122.

Thus, also in this case, the first support part 502A moves while maintaining the angle θ thereof with respect to the moving direction 200 of the tension roller 122.

In other words, also in this configuration example, not only the connected end 181 (see FIG. 8B) provided on the first support part 502A, but also the opposite end 182 moves.

Thus, the first support part 502A moves while maintaining the angle θ thereof with respect to the moving direction 200 of the tension roller 122.

As a result, also in this configuration example, the above-described problem caused by the tension roller 122 being pressed in the moving direction 200 of the tension roller 122 is suppressed.

Although the first and second springs 91 and 92 are provided corresponding to the first and second support parts 502A and 502B in the configuration example shown in FIGS. 5A and 5B, only one spring, 505, is required in the configuration example shown in FIGS. 7A and 7B. Because the component count in the configuration example shown in FIGS. 7A and 7B is lower than that in the configuration example shown in FIGS. 5A and 5B, the cost is reduced.

In the configuration examples shown in FIGS. 5A to 8B, the shaft 501 is provided in the middle between the first and second ends 122A and 122B of the tension roller 122. However, the position of the shaft 501 is not limited thereto.

The shaft 501 may be provided at a position closer to one of the first and second ends 122A and 122B of the tension roller 122.

Furthermore, in the configuration examples shown in FIGS. 5A to 8B, as shown in FIGS. 5A and 7A, the tension roller 122 is located on the extension line of the shaft 501. However, the tension roller 122 may be located at a position shifted from the extension line of the shaft 501.

Figure 9A:
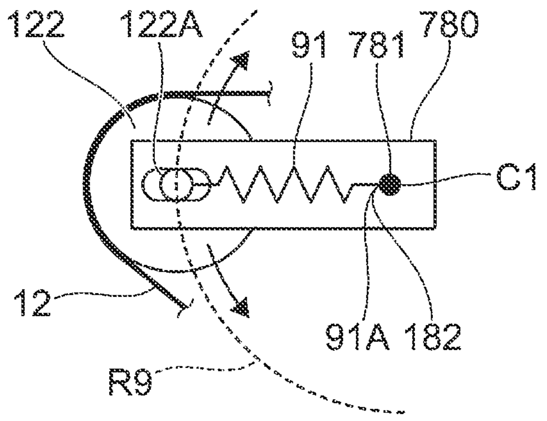
FIGS. 9A and 9B show another configuration example of a mechanism for pressing the tension roller.
Figure 9B:
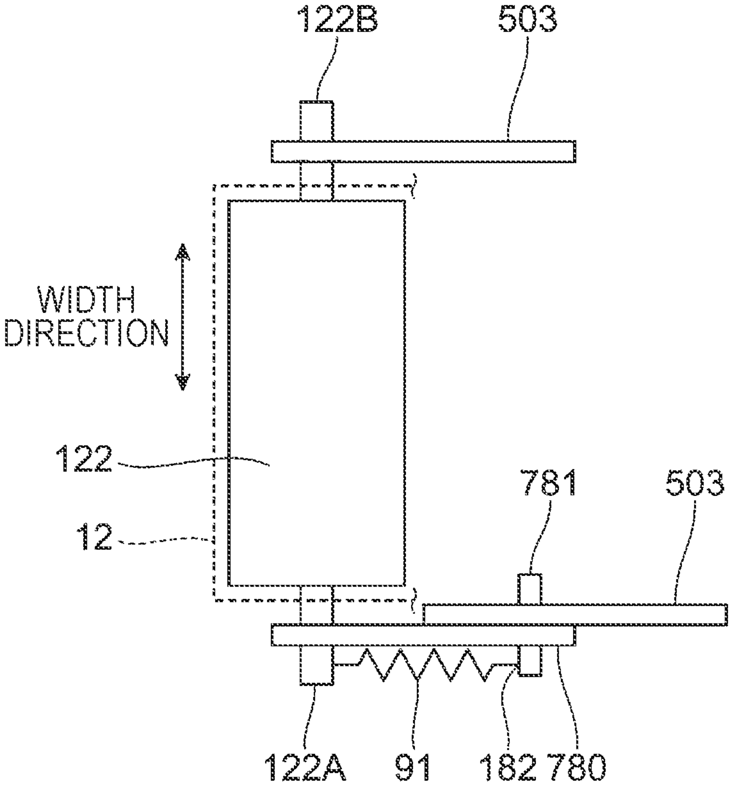

FIGS. 9A and 9B show another configuration example of a mechanism for pressing the tension roller 122.

FIG. 9A shows the tension roller 122 and the like, as viewed from the front side of the image forming apparatus 1, and FIG. 9B shows the tension roller 122 and the like, as viewed from the top of the image forming apparatus 1.

In this configuration example, the tension roller 122 moves along a curved path R9 (see FIG. 9A). More specifically, the first end 122A of the tension roller 122 moves along the curved path R9.

A support member 780 extending in the radial direction of the tension roller 122 and supporting the first end 122A of the tension roller 122 is provided.

The support member 780 rotates about a shaft 781 extending in the axial direction of the tension roller 122.

Thus, the first end 122A of the tension roller 122 moves along the curved path R9.

The support member 780 is supported by the support frame 503 via the shaft 781 and is movable in the circumferential direction of the shaft 781 relative to the support frame 503.

The second end 122B of the tension roller 122 is fixed to the support frame 503 and thus does not move.

Note that, not only the first end 122A of the tension roller 122, but also the second end 122B of the tension roller 122 may be moved along a curved path.

As shown in FIG. 9A, the first spring 91, serving as an example of a pressing member, is disposed at a position closer to the center of curvature Cl of the path R9 than the curved path R9 is.

Because the support member 780 is disposed at a position closer to the center of curvature Cl of the path R9 than the curved path R9 is, the first spring 91 supported by the support member 780 is also located at a position closer to the center of curvature Cl than the path R9 is.

The first spring 91 is supported by the support member 780.

One end 91A of the first spring 91 is supported by the shaft 781. In other words, the opposite end 182 of the first spring 91 is supported by the shaft 781, which is an example of a shaft.

The first spring 91 presses the first end 122A of the tension roller 122 toward the intermediate transfer belt 12, which is located on the opposite side of the path R9 from the center of curvature Cl.

In this configuration example, the first spring 91 is movable about the shaft 781 (see FIG. 9A). As shown in FIG. 9B, the shaft 781 extends in the axial direction of the tension roller 122.

The first spring 91 (see FIG. 9A) moves about the shaft 781, which is located closer to the center of curvature Cl than the curved path R9 is and which extends in the axial direction of the tension roller 122.

The support member 780 supports both the tension roller 122 and the first spring 91. Furthermore, the position of the center of curvature Cl of the path R9 and the position of the shaft 781 located closer to the center of curvature Cl are aligned.

Also in this configuration example, the angle θ of the first spring 91 with respect to the moving direction 200 of the first end 122A of the tension roller 122 is maintained.

Figures 10A, 10B:
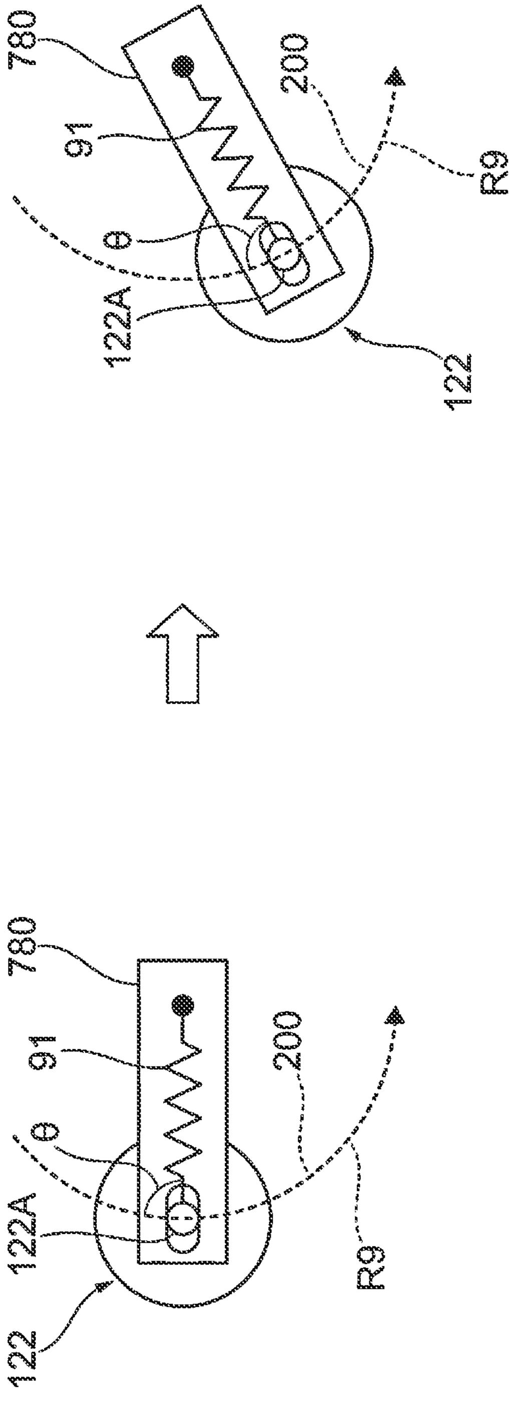

More specifically, as shown in FIGS. 10A and 10B, which show the movement of the tension roller 122 and the like, even when the first end 122A of the tension roller 122 moves downstream in the moving direction 200, the angle θ of the first spring 91 with respect to the moving direction 200 of the first end 122A of the tension roller 122 is maintained.

More specifically, as shown in FIG. 10A, the angle θ of the first spring 91 with respect to the moving direction 200 is approximately 90° before the movement of the first end 122A of the tension roller 122.

As shown in FIG. 10B, the angle θ of the first spring 91 with respect to the moving direction 200 is also approximately 90° after the movement of the first end 122A of the tension roller 122.

Also in this configuration example, the tension roller 122 is not pressed downstream in the moving direction 200 of the tension roller 122. Hence, also in this case, the above-described problem caused by the movement of the tension roller 122 is suppressed.

In this configuration example shown in FIGS. 9A and 9B, the tension roller 122 is tilted so that the intermediate transfer belt 12 moves toward the support member 780 in the width direction of the intermediate transfer belt 12 (see FIG. 9B).

More specifically, in the initial setting, the tension roller 122 is tilted, and, when the image forming apparatus is operating, the intermediate transfer belt 12 moves downward in FIG. 9B.

Hence, when the intermediate transfer belt 12 starts to be driven, the intermediate transfer belt 12 gradually moves toward the support member 780 in the width direction of the intermediate transfer belt 12.

When the intermediate transfer belt 12 reaches a predetermined part, similarly to the above, the first guided part 150A is pressed against the first guide 80A (see FIGS. 2A to 2C) provided on the first end 122A side of the tension roller 122.

Although the configuration in FIGS. 2A to 2C uses the urging spring 97 to press the first guided part 150A against the first guide 80A, another configuration may be used to press the first guided part 150A against the first guide 80A.

For example, a torsion coil spring that rotates the support member 780 about the shaft 781 may be fitted on the shaft 781 (see FIG. 9B) to press the first guided part 150A against the first guide 80A.

When the first guided part 150A is pressed against the first guide 80A, the tension roller 122 is tilted in the direction opposite to the direction in which the tension roller 122 has been tilted. As a result, the intermediate transfer belt 12 moves away from the support member 780.

When the intermediate transfer belt 12 has moved to the opposite side, the force of the first guided part 150A pressing the first guide 80A decreases, and the tilting of the tension roller 122 returns to the initial state. As a result, the intermediate transfer belt 12 moves toward the support member 780 again.

In the configuration example shown in FIGS. 9A and 9B, the intermediate transfer belt 12 moves toward and away from the support member 780 repeatedly.

Figure 11A:
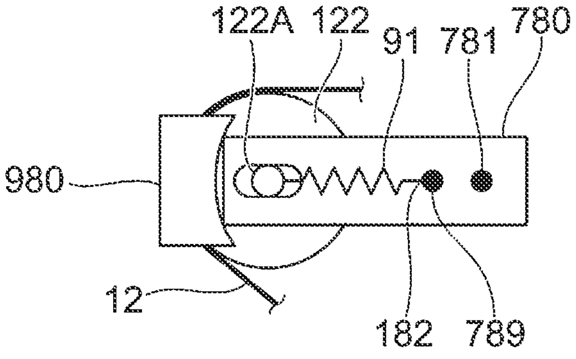
FIGS. 11A and 11B show another configuration example of a mechanism for pressing the tension roller.
Figure 11B:
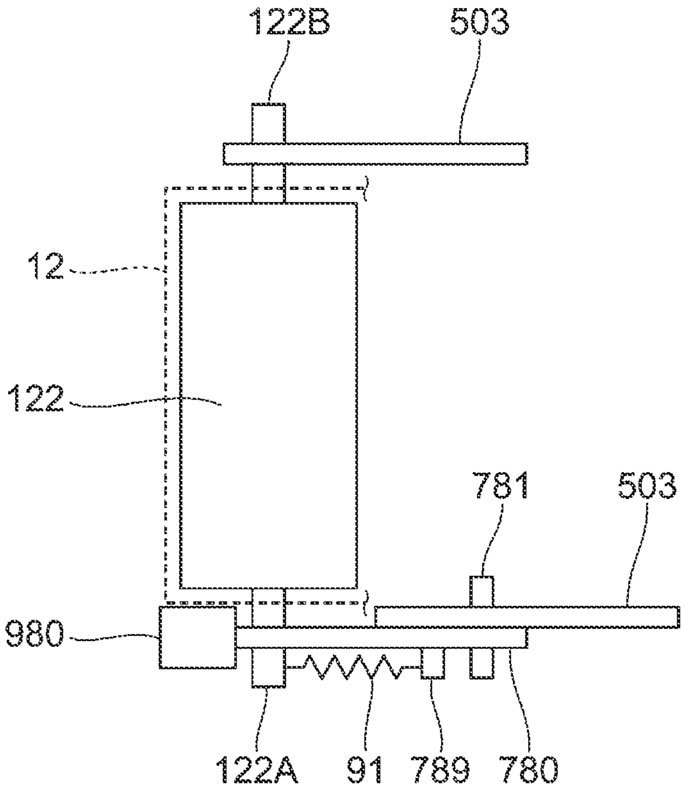

FIGS. 11A and 11B show another configuration example.

Also in this configuration example, the support member 780 that is rotatable about the shaft 781 extending in the axial direction of the tension roller 122 is provided.

The first end 122A of the tension roller 122 and the first spring 91 are supported by the support member 780.

The first spring 91 moves about the shaft 781 when the support member 780 rotates about the shaft 781.

In this configuration example, the opposite end 182 of the first spring 91 is not supported by the shaft 781, but is supported by a support part 789 that is provided on the support member 780 provided separately from the shaft 781.

The opposite end 182 does not need to be supported by the shaft 781, but may be supported by the support part 789, which is provided separately from the shaft 781, like this.

Furthermore, there is a guide 980 for guiding the end of the support member 780 farther from the shaft 781. The guide 980 stabilizes the behavior of the support member 780, compared with a configuration without the guide 980.

Other Configurations

Although the transport device for transporting a toner image has been described as an example of a transport device for transporting the object to be transported, the object to be transported is not limited to the toner image, but may be, for example, a sheet P.

The fixing device 14 (see FIG. 1) may include a belt member, and fixing may be performed while the belt member transports a sheet P.

The use of the above-described configuration shown in FIGS. 5A to 11B in the fixing device 14 suppresses the above-described problem caused by a change in the pressing direction, in which the rotary member is pressed against the belt member.

The second transfer unit 13 (see FIG. 1) may also use a belt member to transport a sheet P. Also in that case, the use of the above-described configuration shown in FIGS. 5A to 11B suppresses the above-described problem.

More specifically, the second transfer unit 13 may include a belt member that runs in a loop, instead of the second transfer roller 134. In that case, the use of the above-described configuration shown in FIGS. 5A to 11B suppresses the above-described problem.

In this exemplary embodiment, the transport belt 25 and the cooling device 15 shown in FIG. 1 also use the belt member to transport a sheet P. The use of the above-described configuration shown in FIGS. 5A to 11B in the transport belt 25 and the cooling device 15 suppresses the above-described problem.

The above-described configuration may be used not only in the devices for transporting an object to be transported during an image forming operation, but also in devices that are unrelated to the image forming operation.

Also in devices that are unrelated to the image forming operation, the use of the above-described configuration shown in FIGS. 5A to 11B suppresses the above-described problem.

The configuration in which the tension roller 122 is urged against the inner circumferential surface 12B of the intermediate transfer belt 12 (see FIG. 1), in other words, the configuration in which the rotary member is pressed against the inner circumferential surface of the belt member, has been described above.

The above-described configuration shown in FIGS. 5A to 11B may also be applied to a configuration in which a rotary member is pressed against the outer circumferential surface of a belt member, such as the intermediate transfer belt 12.

Figure 12:
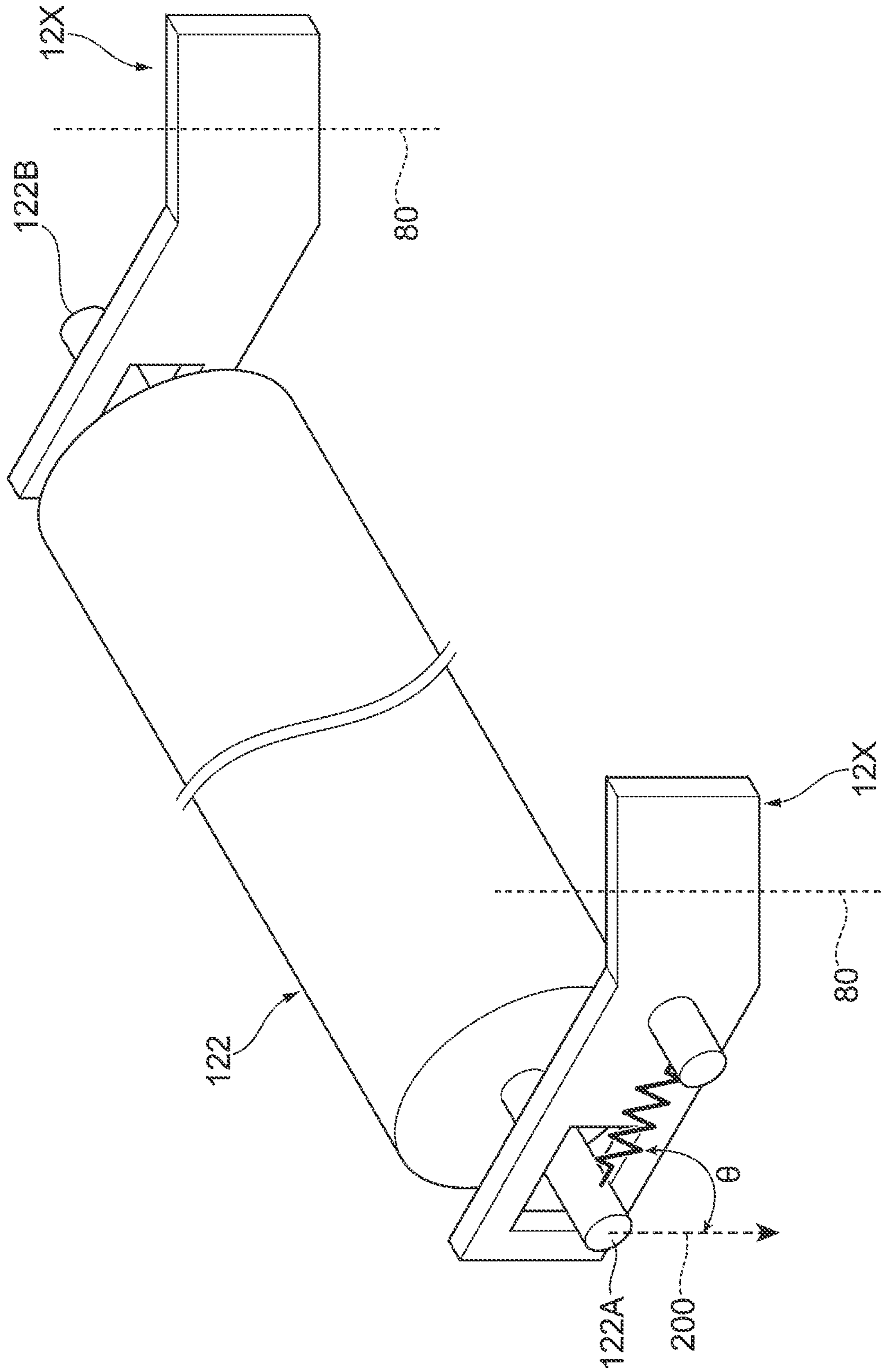

Furthermore, as shown in FIG. 12, which show another configuration example of the tension roller 122 and the like, support parts 12X for supporting the first and second springs 91 and 92 (the second spring 92 is not shown in FIG. 12) may be independently provided.

In this configuration example, the support parts 12X are guided by the guides 80 extending in the moving direction 200 of the tension roller 122, and the orientation of the support parts 12X with respect to the guides 80 is maintained.

Also in this case, even when the first end 122A or the second end 122B of the tension roller 122 moves in the moving direction 200, the first spring 91 or the second spring 92 moves while maintaining the orientation thereof with respect to the moving direction 200.

In other words, also in this case, the first spring 91 or the second spring 92 moves while maintaining the angle θ thereof with respect to the moving direction 200 of the first end 122A or the second end 122B of the tension roller 122.

In the configuration example shown in FIGS. 5A to 8B, the first and second springs 91 and 92 are attached to the common support member 502, so that the first and second springs 91 and 92 operate in association with each other.

Alternatively, as shown in FIG. 12, the angle θ of the first spring 91 or the second spring 92 with respect to the moving direction 200 may be maintained with the independently movable first and second springs 91 and 92.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A transport device for an image forming apparatus comprising:

a belt member that runs in a loop to transport an object to be transported, the belt member having an outer circumferential surface and an inner circumferential surface;

a rotary member that is pressed against one of the outer and inner circumferential surfaces of the belt member and that is movable in a moving direction; and a pressing member that presses the rotary member toward the one of the outer and inner circumferential surfaces of the belt member and that moves in the moving direction while maintaining the angle thereof with respect to the moving direction when the rotary member moves in the moving direction, wherein the rotary member and the pressing member rotate in the moving direction around an axis which is perpendicular to a line passing through both ends of the rotary member.

2. The transport device according to claim 1, wherein:

the pressing member has a connected end located on the rotary member side and connected to the rotary member, and an opposite end located on the opposite side from the connected end; and the opposite end of the pressing member moves in the moving direction when the rotary member moves in the moving direction, so that the angle of the pressing member with respect to the moving direction is maintained.

3. The transport device according to claim 2, wherein the rotary member and the opposite end move by the same amount in the moving direction.

4. The transport device according to claim 1, wherein:

the pressing member is a spring; and the inclination of the spring with respect to the moving direction is maintained.

5. The transport device according to claim 1, wherein the pressing member urges the rotary member against the one of the outer and inner circumferential surfaces of the belt member by receiving an urging force from an urging member.

6. The transport device according to claim 1, further comprising:

a shaft that is located at the same position as the axis and that rotatably supports the rotary member and the pressing member.

7. A transport device for an image forming apparatus comprising:

a belt member that runs in a loop to transport an object to be transported, the belt member having an outer circumferential surface and an inner circumferential surface;

a rotary member that is pressed against one of the outer and inner circumferential surfaces of the belt member and that is movable in a predetermined moving direction; and a pressing member that presses the rotary member toward the one of the outer and inner circumferential surfaces of the belt member along a pressing direction, regardless of the moving in the moving direction and that moves in the moving direction while maintaining the angle thereof with respect to the moving direction when the rotary member moves in the moving direction, wherein the rotary member is provided such that at least a portion thereof moves along a curved path;

the pressing member is located closer to a center of curvature of the curved path than the curved path;

the pressing member is movable about a shaft located closer to the center of curvature of the curved path than the curved path, so that the angle of the pressing member with respect to the moving direction is maintained; and wherein a first end of the rotary member, the pressing member, and the center of curvature are aligned along the pressing direction.

8. The transport device according to claim 7, wherein the position of the center of curvature of the curved path and an end position of the shaft are coincident.

9. A transport device for an image forming apparatus comprising:

a belt member that runs in a loop to transport an object to be transported, the belt member having an outer circumferential surface and an inner circumferential surface;

a rotary member that is pressed against one of the outer and inner circumferential surfaces of the belt member;

a pressing member that presses the rotary member toward the one of the outer and inner circumferential surfaces of the belt member along a pressing direction; and a shaft whose longitudinal direction is parallel to the pressing direction, wherein the pressing member is rotatable about the shaft.

10. The transport device according to claim 9, wherein the pressing member includes a first-end pressing member that presses one end of the rotary member in the axial direction toward the one of the outer and inner circumferential surfaces of the belt member, and a second-end pressing member that presses the other end of the rotary member in the axial direction toward the one of the outer and inner circumferential surfaces of the belt member, the first-end pressing member and the second-end pressing member being movable about the shaft.

11. The transport device according to claim 9, wherein the pressing member presses one end of the rotary member in the axial direction toward the one of the outer and inner circumferential surfaces of the belt member and is movable about the shaft extending in the pressing direction, the shaft being located closer to the other end of the rotary member than the one end is.

* * * * *